Aug. 18, 1942.   H. R. JONES   2,293,145
DEVICE FOR ASSEMBLING TANK PLATES
Filed April 6, 1940   2 Sheets-Sheet 1

Hugh R. Jones INVENTOR.
BY Jesse R. Stone
Leslie B. Clark
ATTORNEYS

Aug. 18, 1942.  H. R. JONES  2,293,145

DEVICE FOR ASSEMBLING TANK PLATES

Filed April 6, 1940  2 Sheets-Sheet 2

Hugh R. Jones INVENTOR.

BY *Jesse R. Stone*
*Lester D. Clark*

ATTORNEYS

Patented Aug. 18, 1942

2,293,145

UNITED STATES PATENT OFFICE 2,293,145

DEVICE FOR ASSEMBLING TANK PLATES

Hugh R. Jones, Beaumont, Tex., assignor to The Petroleum Iron Works Company of Texas, Beaumont, Tex.

Application April 6, 1940, Serial No. 328,275

6 Claims. (Cl. 113—99)

My invention relates to devices employed in assembling and retaining tank plates in position while they are being welded. It is particularly adapted for supporting the tank plates for butt welding along the contacting edges of the plates making up the tank.

It is an object of my invention to provide a plate clamping means which may be easily and quickly applied and which will support the plates rigidly in position and properly aligned while the welding operation is performed.

I desire to provide in connection with adjacent plates a supporting bracket which is formed to receive a plate which is forced rigidly against the adjacent plates along the edges of said plates.

The invention resides particularly in the construction and arrangement of the devices by which my invention is accomplished and reference is made to the drawings herewith wherein a preferred embodiment of the device is disclosed.

In constructing a steel tank ordinarily employed for the storage of liquids, such as oil, it is becoming popular to weld the adjacent edges of the tank plates together and in so doing it is necessary to place plates which are to be welded in position and then provide a clamping means which aligns the plates accurately with each other, spaced apart so as to receive a bond of welding material.

Figure 1:
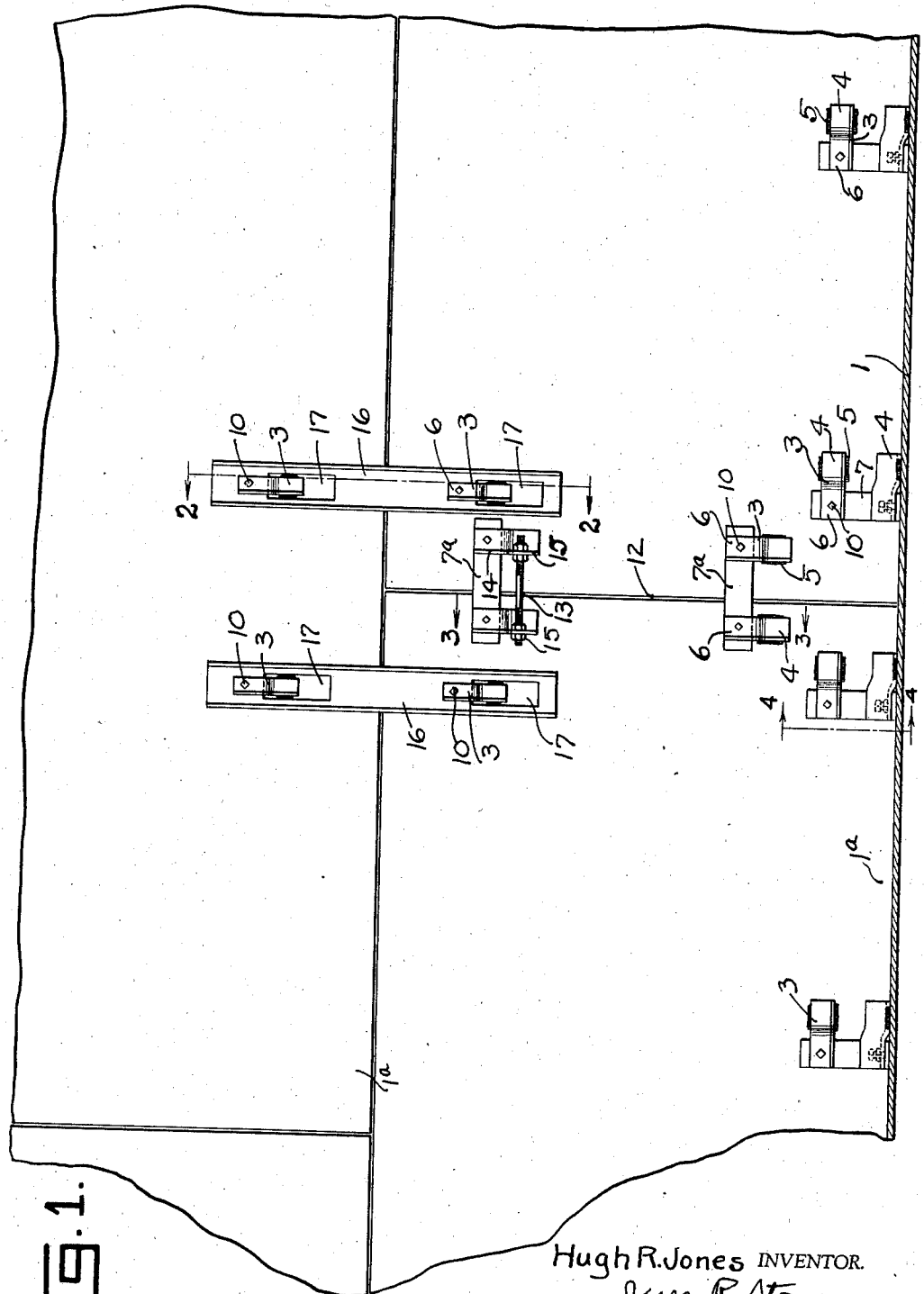
Fig. 1 is a broken side elevation of a portion of the tank having my invention employed thereon for holding the said plates in position for welding.
Figure 2:
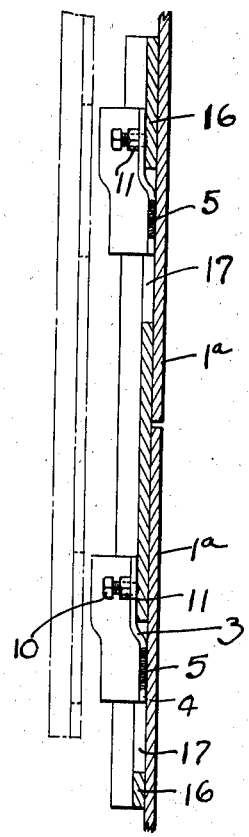
Fig. 2 is a broken section on the line 2—2 of Fig. 1.
Figure 3:
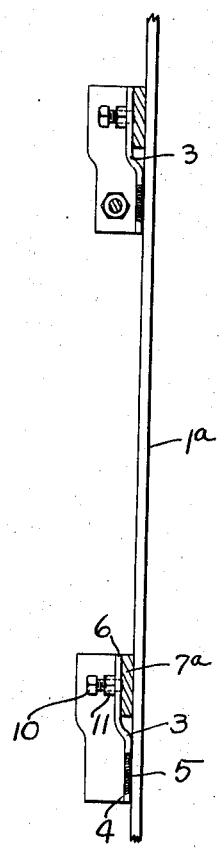
Fig. 3 is a section taken along the seam between the two plates indicated by the line 3—3 of Fig. 1.
Figure 4:
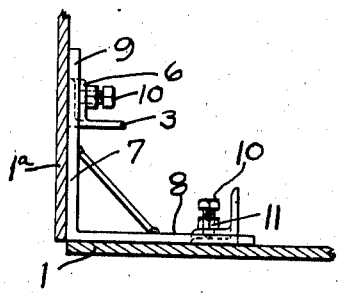
Fig. 4 is a sectional detail on the line 4—4 of Fig. 1.
Figure 5:
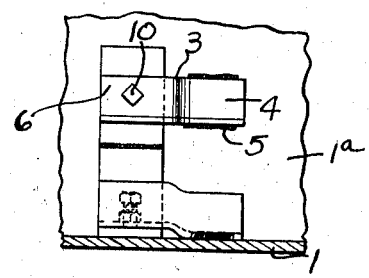
Fig. 5 is an enlarged detail of one of the plates shown at the bottom of Fig. 1.

My invention involves a device by means of which said plates may be held in firmly aligned position so that the welding may be performed. In Fig. 1 I have shown a floor plate 1, which may be understood as having been laid down and formed in circular shape so that the side walls may be secured thereto. In Fig. 4 the floor plate 1 is shown as having positioned adjacent thereto an upright wall plate 1a which may be understood as being arcuate so as to form a portion of the side wall of the tank. In order to hold the plate 1a in adjusted position relative to the floor plate a plurality of brackets 3, which are preferably made of angle iron, are provided. One end of the angle 3 is curved upwardly relative to the other and the end indicated at 4 in the drawing is welded at 5 to the tank plate. The other end 6 projects upwardly somewhat from the level of the end 4 so as to include between the bracket and the tank plate a clamping plate 7. In the embodiment shown in Fig. 4 the clamping plate 7 is angular in shape so as to engage on one arm 8 thereof with the floor plate and with the other arm 9 thereof against the side plate 2.

The ends of the bracket which project over the clamping plate 7 are provided with set screws 10. The overhanging end of the bracket may have secured thereto a nut 11 through which the set screw is threaded so that when the set screw is screwed toward the clamping plate it will force said plate tightly against the said tank plate. With reference then to Fig. 4 it will be seen that when the set screws 10 are tightened at both ends of the bracket the clamping plate 7 will be held rigidly against the plate to which the bracket is secured, thus aligning the tank plates in proper position.

The clamping devices may be arranged around the bottom of the floor plate as close together as is necessary to properly support the side plates at their lower edges. Along the margin between the ends of the adjacent tank plates I secure a plurality of similar brackets and clamping devices which, because they secure the ends of the tank plates in position along one margin only, may be formed in lateral alignment. In Fig. 1, for example, the brackets 3 employed therein are secured to the side plate 1a at their lower ends, one on each end of the adjacent plates. The upper end of each of the brackets 4 is spaced from the tank plate so as to allow a clamping plate 7a to be inserted between the upper ends 6 of the two brackets 4 and the set screws 10 are then tightened to force the clamping plate 7a rigidly against the tank plates and thus pull the ends of the adjacent plates into alignment with each other ready to be welded along the seam 12 between them.

In order that a longitudinal pull upon the tank plates may be exerted to pull the ends of the tank plates into properly spaced position I may employ a construction like that shown in the embodiment just described with a clamping 7a to hold the tank plates aligned with each other and may employ in addition an adjusting bolt 13. Said bolt is extended through the upstanding web 14 of each of the brackets and threaded at both ends to receive adjusting nuts 15 on opposite sides of the web. As will be noted in Fig. 1, the adjusting bolt 13 can be rotated to provide a type of turnbuckle by means of which the adjacent edges of the plates may be arranged in proper spaced relation to receive the bond of welding material.

To mount another row of plates in position vertically above the adjacent lower plates a modification of my inventive idea is employed. On the lower plate I secure a bracket 3 and in position aligned vertically above the first bracket I position a second bracket 3 on the next upper plate. Where the upper row of plates is arranged so that the end seam will be staggered relative to the seam in the plates below, as shown in Fig. 1, I secure another pair of brackets 3 to the edges of the adjacent upper and lower plates. The brackets are arranged with their upper ends 6 spaced from the tank plate to receive a clamping plate 16. Said plate is arranged with longitudinally extending openings 17 therein to receive the two brackets 3. The clamping plate 16 in this embodiment is preferably channel plate having its opposite edges turned upwardly in the usual manner.

The brackets 3 which are employed in use with this type of clamping plate are identical with those previously noted. When arranged in vertically aligned position, as shown, with the openings 17 in the clamping plates arranged to receive the brackets, it will be seen that when the clamping plate has been fitted over the brackets it may be dropped downwardly behind the upper ends 6 of the brackets and will thus tend to align the tank plates. The alignment may be made rigid by tightening the set screws 10 therein to force the clamping plate rigidly against the two tank plates, thereby bringing them in vertical alignment as will be obvious.

In the use of my clamping plate for securing the tank plates in position it will be obvious that the operations will be exceedingly simple. The brackets may be welded to the tank plates in the desired position with one end of the bracket spaced from the plate sufficiently to receive the clamping plate, and then the clamping plates may be dropped or moved into position and the set screws tightened to bring the tank plates into alignment. After a sufficient number of these clamping plates have been tightened in position the tank plates will be so aligned that the welding torch and rod may be employed to deposit a bond of welding material along the seams between the edges of the adjacent plates. When the plates have been thus welded the clamping plates may be easily and quickly removed and the brackets may be knocked loose from the tank plates and the welding operation will be completed.

What is claimed is:

1. A plate clamping device to align and secure tank plates in welding position including brackets secured to adjacent tank plates, one end of each bracket being secured to the tank plate and the other end bent upwardly in spaced relation to said plate, set screws in said upwardly bent ends, and a clamping plate engaging in adjacent brackets and adapted to be forced by the adjustment of said set screws into tight engagement with said tank plates.

2. A tank plate clamping device including a pair of brackets secured adjacent the edges of adjacent tank plates, each bracket having an arm spaced from the tank plate, a clamping plate one portion of which is formed to lie against the face of one tank plate and the remaining portion being formed to lie against the face of an adjacent plate, said clamping plate engaging beneath said arms, and set screws in said arms to be tightened against said clamping plates.

3. A tank plate clamping device including a pair of brackets adjacent the edges of adjacent tank plates, each bracket having an arm spaced from the tank plate, a clamping plate adapted to extend across the adjacent edges of said tank plates and fit beneath said arms, set screws in said arms to be tightened against said clamping plates, and additional means engaging through said brackets to adjust the distance between said brackets.

4. A tank plate clamping device including, vertically aligned brackets welded to adjacent upper and lower tank plates, the upper end of each bracket being spaced slightly from its tank plate, a clamping plate having openings therein spaced to fit over said brackets and engage behind said upper ends, and set screws in said brackets to tighten said clamping plate against said tank plates.

5. A tank plate clamping device including, vertically aligned brackets welded to adjacent upper and lower tank plates, the upper end of each bracket being spaced slightly from its tank plate, a clamping plate comprising a channel iron strip having upper and lower openings therein spaced to receive said brackets and by downward movement to engage behind said upper ends, and means to clamp said clamping plate between said upper ends and said tank plates.

6. A tank plate clamping device including, vertically aligned brackets welded to adjacent upper and lower tank plates, the upper end of each bracket being spaced slightly from its tank plate, a clamping plate having openings therein spaced to fit over said brackets and engage behind said upper ends, and means in said upper ends to engage and force said clamping plate against said tank plates.

HUGH R. JONES.